United States Patent [19]

Deptuch

[11] 3,710,354

[45] Jan. 9, 1973

[54] BIPOLAR READ-OUT CIRCUIT FOR NONDESTRUCTIVE MAGNETIC MEMORY

[75] Inventor: Kazimierz J. Deptuch, Chicago, Ill. 60647

[73] Assignee: GTE Automatic Electric Laboratories Incorporated, Northlake, Ill.

[22] Filed: April 2, 1970

[21] Appl. No.: 25,058

[52] U.S. Cl. ........................340/174 TF, 340/174 PW

[51] Int. Cl. ..............................................G11b 5/00

[58] Field of Search.......................................340/174

[56] References Cited

UNITED STATES PATENTS

| | | | |
|---|---|---|---|
| 3,447,140 | 5/1969 | Bobeck | 340/174 |
| 3,436,739 | 4/1969 | Bartik | 340/174 |
| 3,407,397 | 10/1968 | Snare | 340/174 |
| 3,504,358 | 3/1970 | Chow | 340/174 |

*Primary Examiner*—Maynard R. Wilbur
*Assistant Examiner*—Charles D. Miller
*Attorney*—K. Mullerheim, B. E. Franz and Robert F. Van Epps

[57] ABSTRACT

In plated wire nondestructive memory systems, memory read-out circuits include polarity reversing means. The successive pulses for different interrogations have opposite polarities to retard skew which is a gradual rotation of magnetic axis caused by successive interrogation of magnetic elements having anisotropic characteristics. The reversal of polarity on each interrogation of the same magnetic elements prolongs the retention of information in memories.

4 Claims, 3 Drawing Figures

INVENTOR
KAZIMIERZ J. DEPTUCH
BY Glenn H. Antrim
ATTORNEY

BIPOLAR READ-OUT CIRCUIT FOR NONDESTRUCTIVE MAGNETIC MEMORY

BACKGROUND OF THE INVENTION

This invention pertains to read-out driving circuits in magnetic thin film wire memories.

This invention is an improvement in nondestructive memories utilizing thin magnetizable layers exhibiting a preferential magnetic direction. The improvement is particularly adaptable to a preferred type of memory in which cylindrical thin magnetic films are plated on conductive wire. The wires on which the film is deposited, function as digit lines or conductors; and word conductors or solenoids, that may be printed wiring, are oriented perpendicular to the plated digit conductors. Each point along the thin film at the intersections of the word conductors have have been magnetized in one of the easy directions according to whether a "0" or a "1" has been stored. Current flow in the word conductors provides a field having a vector in the hard direction of magnetization of the film.

Information is conventionally read-out nondestructively along a word line by applying to it a pulse of current in only one direction to rotate the vector of the stored field through an acute angle. However, either direction of current flow provides output reading voltage of the same polarity. In order to prevent destruction of the stored field in the easy direction by large interrogating currents, only small currents are used to rotate the stored filed sufficiently to obtain a readable output signal above noise signal, but even when the interrogating current is kept small, repeated interrogation, especially when the interrogating current is always in the same direction, causes loss of information due to skew. Aging effects resulting from skew, that cause departure of the easy axis of magnetization from its original direction, are discussed in the article "Quantitative Prediction of Aging Effects in Plated Wires" by J. P. McCallister and S. J. Strobl published in IEEE Transactions on Magnetics, September 1969, Volume MAG-5, Number 3.

According to U.S. Pat. No. 3,387,289 issued to K. Walter on June 4, 1968, the use of an additional regenerative pulse after each interrogating pulse is used to interrogate plane, magnetic, thin-film elements. According to theory, the interrogating pulse in one direction causes a small portion of the film to be magnetized in a direction opposite to that of the easy direction of magnetization representing information. A regenerative pulse after an interrogating pulse restores the direction of the small portion to its initial condition so that the strength of the original stored field is not gradually lost.

Aging that causes a loss of information in magnetic thin film wire memory elements may differ substantially from aging in planar magnetic thin film elements. Since the circumferential easy direction path in a thin film wire element is closed, the tendency for small portions of the film to reverse polarity completely is less than where the film is planar. Nevertheless, when the vector of a circumferential field is rotated repeatedly in only one direction, even though the angle over which it is rotated is small, the vector of the field over a long period gradually rotates away from its initial circumferential, easy axis. As a field gradually loses its original substantially perpendicular relationship with the digits or sense conductors of the memory, the output induced into the sense conductors diminishes until the stored information is lost.

SUMMARY OF THE INVENTION

Successive interrogating pulses applied to word conductors for reading out information stored in an easy direction of cylindrical magnetic thin film are inverted to decrease skew of the stored field. In a system in which a thin-film, wire memory is to be addressed randomly, flip-flops are connected in drive circuits that supply word addresses to word conductors of the memory. The pulses supplied to the drive circuits by the address circuits are unipolar, and each pulse is to cause read-out of the memory. The flip-flops in the driving circuits alternate the polarity of current pulses applied to each word conductor of the memory, the read-out for each pulse being substantially independent of the direction of flow of the current. In a system in which all the word conductors of a memory are to be addressed sequentially, a single polarity control circuit rather than individual flip-flop circuits can control the polarity of interrogating pulses supplied by the drivers.

DESCRIPTION OF THE PREFERRED EMBODIMENTS

Figure 1:
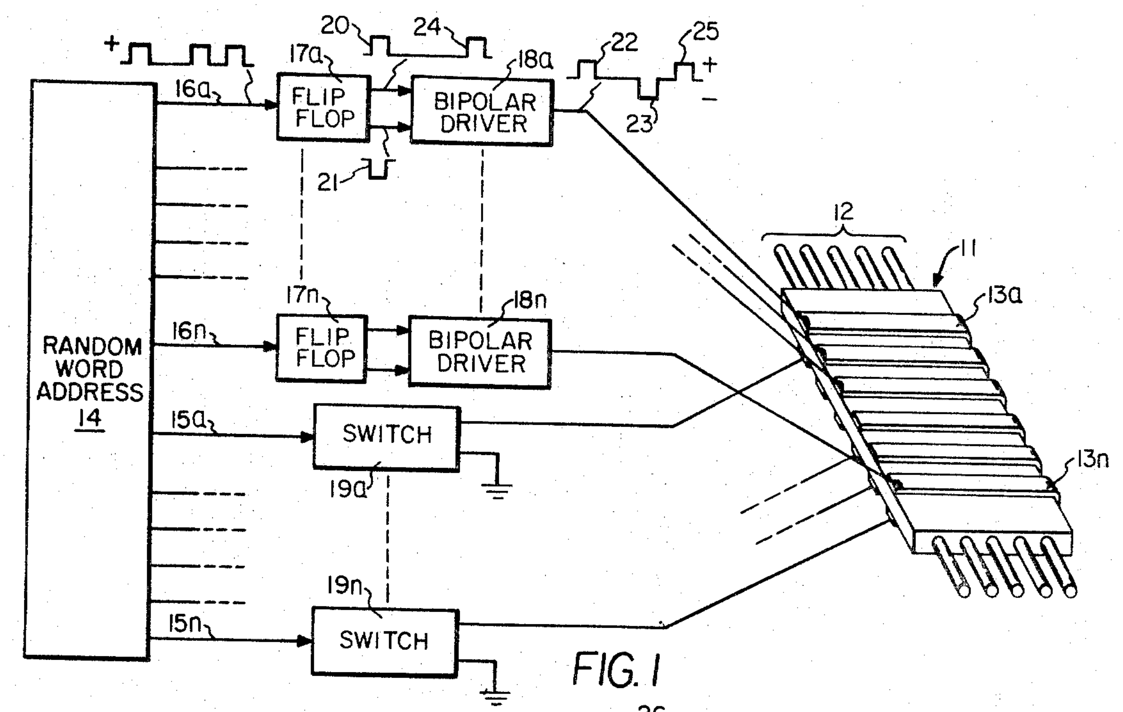
FIG. 1 is a block diagram of a portion of a magnetic thin-film wire memory system having bipolar interrogating drivers that are to be selected randomly.

In FIG. 1, memory 11 is the type that has plated wires as the digit or sense conductors 12. The plating is a thin film that has anisotropic characteristics with the direction of the easy access being circumferential. The plated wires are positioned parallel in a longitudinal direction through a plastic holder that has on its outer surfaces plated word conductors **13*a*–13*n* oriented perpendicular to the digit conductors 12**.

In order to interrogate the word conductors **13*a*–13*n* , a random word address circuit 14 applies operating signals to one of its output conductors 15*a*–15*n* and simultaneously a pulse of predetermined polarity to one of its output conductors 16*a*–16*n*. Each of the output conductors 16*a*–16*n* is connected to a respective flip-flop 17*a*–17*n* for applying a pulse of current to a respective word conductor 13*a*–13*n*. The flip-flops 17*a*–17 each have a pair of outputs connected to inputs of corresponding bipolar drivers 18*a*–18*n*, and an output of each bipolar driver is connected to one terminal of a respective word conductor 13*a*–13*n*. The other end of the selected word conductor 13*a*–13*n* is connected through an operated switch 19*a*–19*n*** to a common terminal of a source of current.

Figure 3:
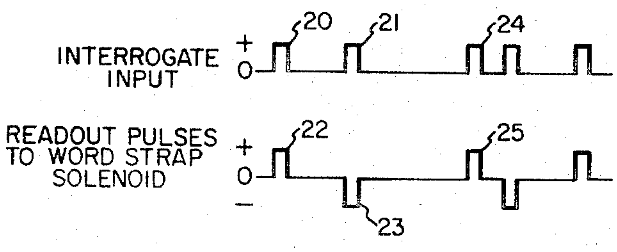
FIG. 3 is a set of wave forms to show the polarities of interrogating pulses from the output of addressing circuits and respective interrogating pulses applied to word conductors of magnetic thin-film wire memories.

In response to the application of an interrogating pulse, the flip-flop **17*a* applies a pulse 20 of one polarity to the input of the bipolar driver 18*a***, and the driver 18*a* responds to provide a pulse 22 of current in one direction through the word conductor 13*a;* and in response to application of a succeeding interrogating pulse, the flip-flop 17*a* causes the bipolar driver 18*a* to provide a pulse of current 23 in the opposite direction through the word conductor 13*a*. The application of still another pulse to the input of the flip-flop 17*a* provides a pulse 24 having the same polarity of the pulse 20, and causes the bipolar driver to provide a pulse of current 25 flowing in the same direction as the pulse 22 through the word conductor 13*a*. The relationship of the interrogate input impulses to the respective read-out pulses is shown clearly in FIG. 3.

Figure 2:
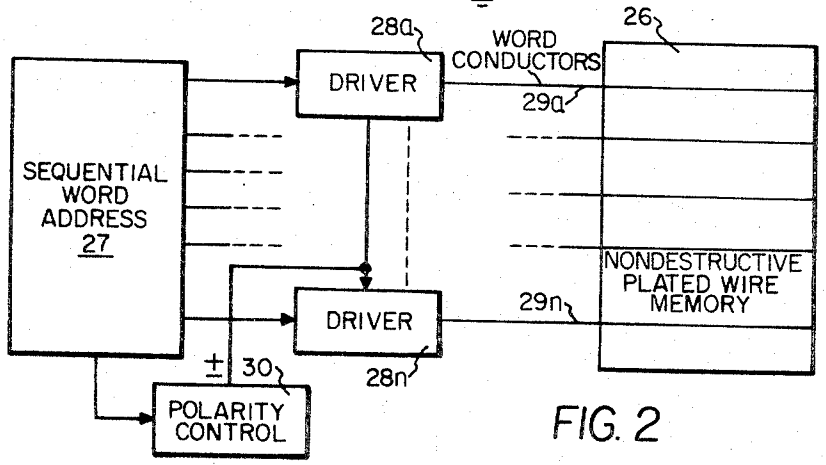
FIG. 2 is a block diagram of a magnetic thin-film wire system in which interrogating drivers are selected sequentially.

In FIG. 2 the word conductors of the printed wire memory 26 are interrogated sequentially so that a polarity control for reversing the polarity of successive pulses of current to be applied to the word conductors can be common to all word conductors rather than individual to each word conductor as shown in FIG. 1. The outputs of a sequential word address circuit 27 are applied to control input circuits of drivers 28*a*–28*n*, and the outputs of the drivers are connected to respective word conductors 29*a*–29*n* of the memory 26. A polarity control circuit 30 has an input circuit connected to the sequential word address 27 and an output circuit connected to an input circuit of each of the drivers 28*a*–28*n* for reversing the direction of current applied to the word conductors at the beginning of each sequence of interrogation.

When the amount of interrogating current in one direction equals the amount of current in the opposite direction over a short period, the tendency to rotate the axis of magnetization of stored information by interrogating current in one direction is substantially canceled by the tendency to rotate the axis in an opposite direction. When opposite tendencies to rotate the field cancel over a period, the field may be described as having a zero duty factor. The embodiments described above provide zero duty factor and result in prolonged retention of information in nondestructive magnetic memories.

I claim:

1. Apparatus for non-destructively reading out digital information stored in a magnetic memory system of the type including a plurality of word-organized memory elements, each said element having anisotropic magnetic field characteristics and being magnetizable in a selected direction of the easy axis to store information in the remnant field thereof, and a plurality of word conductors magnetically coupled to respective ones of said memory elements such that the application of current pulses to any of the selected ones of said word conductors produces a field vector substantially in the direction of the hard axis of said respective memory elements, said non-destructive read-out apparatus comprising a word address having a plurality of outputs, one corresponding to each of said word conductors;

a bipolar word driver coupled between each word address output and a corresponding word conductor, providing the read pulses which are unipolar current pulses at either of first and second polarities, and operative to apply a unipolar pulse of interrogating current to said word conductor in response to an input from said word address, said unipolar interrogating current pulse having a magnitude such that the magnetic field produced thereby combines with said remnant magnetic field to provide a magnetic field vector in a direction intermediate the directions of the hard axis and easy axis of said memory element each said unipolar pulse performing a complete read operation; and means including a flip flop circuit coupled between said word address and said bipolar word driver for alternating the polarity of successive unipolar interrogating current pulses applied to any given word conductor such that the duty factor of said magnetic field vector of each said magnetic memory element is substantially zero and aging due to magnetic axis rotation caused by successive interrogation of said memory is retarded.

2. Apparatus as recited in claim 1 wherein said word address is a random word address, and said polarity alternating means comprises plurality of flip-flop circuits, one coupled between each output of said random word address and said bipolar word drivers.

3. Apparatus as recited in claim 1 wherein said word address is a sequential word address whereby each word in said memory is sequentially interrogated, and said polarity alternating means comprises a polarity control circuit coupled between said sequential word address and in common with all said bipolar word drivers in said read-out apparatus.

4. Apparatus as recited in claim 1 wherein said memory elements are wires having a plated coating of anisotropic magnetic material, and said word conductors are printed circuit conductors disposed across and spaced from said wires.

* * * * *